UNITED STATES PATENT OFFICE.

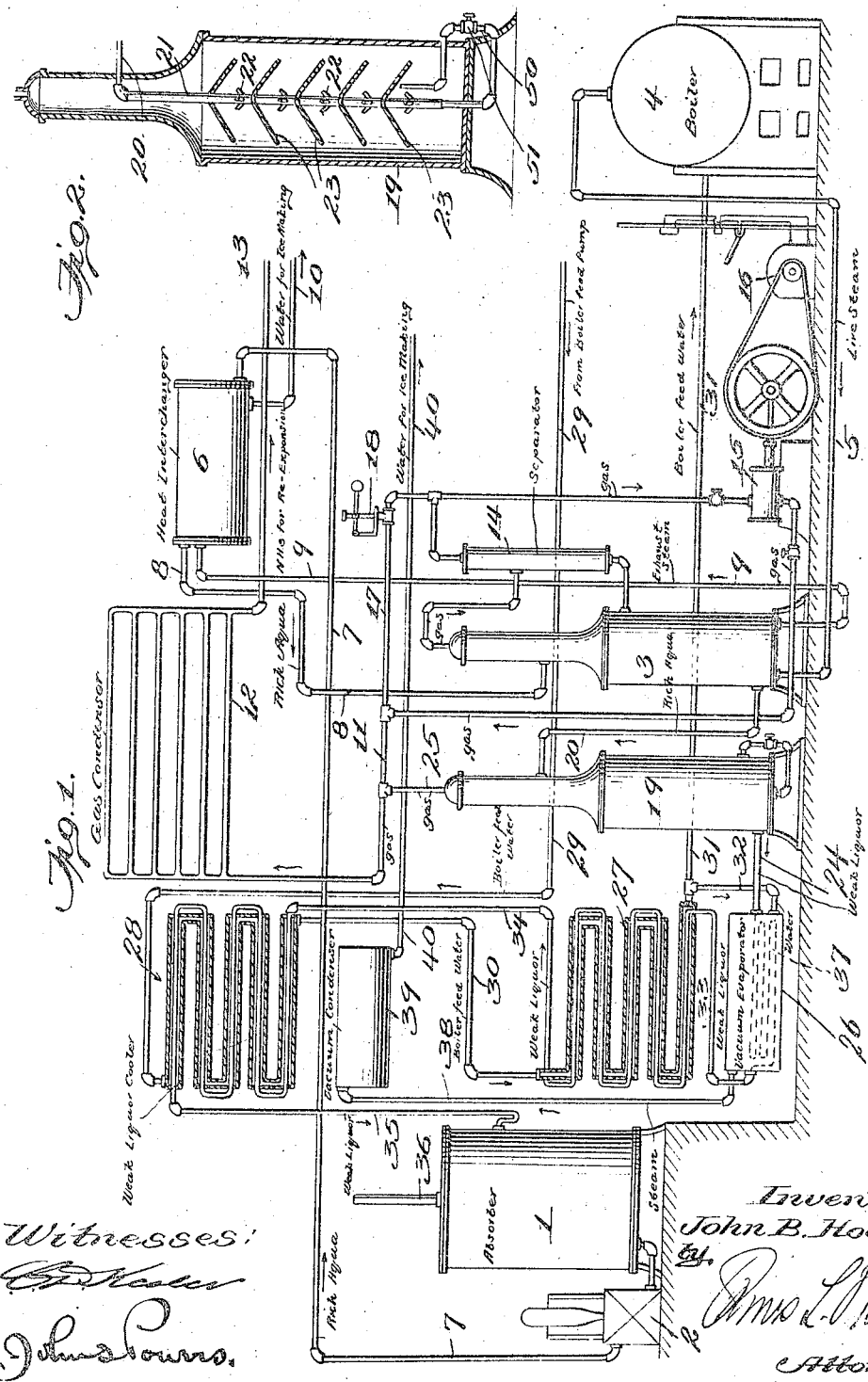

JOHN B. HOWE, OF ATLANTA, GEORGIA.

ABSORPTION REFRIGERATION SYSTEM.

1,161,678. Specification of Letters Patent. Patented Nov. 23, 1915.

Application filed April 10, 1914. Serial No. 830,987.

*To all whom it may concern:*

Be it known that I, JOHN B. HOWE, a citizen of the United States, residing at Atlanta, in the county of Fulton and State of Georgia, have invented new and useful Improvements in Absorption Refrigeration Systems, of which the following is a specification.

This invention relates to improvements in absorption refrigeration systems. In practice, these systems are of two kinds, high pressure steam systems and exhaust steam systems.

The high pressure steam systems are operated with boiler pressure on the generators and also on the auxiliary apparatus and, therefore, require a relatively large amount of steam in which fact is found the principal objection to this type of installation.

The exhaust steam systems are operated with boiler pressure on the auxiliary apparatus, but with exhaust pressure on the generators and, therefore, require more extensive heat absorbing surfaces in the generators. The chief objections to this type of installation is found in its initial cost and in excessive loss of heat due to radiation. There are also other substantial objections to which it is unnecessary to refer, but which are concerned with added maintenance, cost and waste or dead loss of heat.

The objects of the present invention are to provide a system which may be installed at relatively low cost and may be operated at a minimum expense and with high efficiency. Pursuant to this object, the present system provides for the generation of gas on high pressure steam, for the utilization of but one application of extrinsic heat to effect both primary and secondary gas generating operations, for the utilization of the exhaust steam to heat the rich aqua before it reaches the generators, for the utilization of the gas as a motive power agency in operating a dynamo driving engine by means of which power for the operation of all the auxiliary apparatus is developed, for the utilization of the weak aqua in making up the deficiency of distilled water required for ice, for the utilization of the weak aqua in heating the boiler feed water, and for the correlation of the various elements of the apparatus in such manner that the utilization of heat is most efficient as regards both the relative number or percentage of units brought into play and the manner of their employment.

A refrigerating system in which the features of the invention are incorporated is illustrated in the accompanying drawing, wherein:—

Figure 1 is a diagram of the system as an entirety; Fig. 2 is a detail sectional view of the secondary generator.

The rich aqua is formed in an absorber 1 of any suitable construction from which it is forced by a pump 2 to the primary generator 3. In the generator 3 the gas is liberated by steam under high pressure which is transmitted to said generator directly from the boiler 4 through a pipe 5. The generator 3 may be of any approved construction capable of efficiently utilizing direct or high pressure steam in the distillation of the gas.

The two fluids which pass through the generator 3, *i. e.*, the rich aqua and the steam, both pass through an element 6, the rich aqua passing through the element 6 before it reaches the generator 3 and the steam passing through the element 6 after it leaves the generator 3. The element 6 is a heat interchanger and its function is two fold, viz: to preliminarily heat the rich aqua so as to promote the boiling off of the gas in the generator 3 and to condense the steam which exhausts from said generator. The rich aqua heater 6 is connected to the pump 2 by a pipe 7 and the rich aqua is conveyed from the heater 6 to the generator 3 by a pipe 8 which to all intents and purposes forms a continuation of the pipe 7. The steam which exhausts from the generator 3 is conducted by a pipe 9 to the rich aqua heater 6 where it yields its remaining heat to the inflowing stream of aqua and is thereby condensed, the distilled water being conducted away by a pipe 10 to the ice making apparatus.

The gas which is liberated in the generator 3 passes through a line of piping 11 to a condenser 12 of any approved construction wherein it is liquefied in the usual manner. The liquid ammonia is conducted away for reëxpansion by a pipe 13. A separator 14 and an ammonia-gas operated engine 15 of suitable construction are interposed in the line 11. The separator 14 returns any aqua that may have been carried over with the escaping gas to the generator 3. The gas passes to the engine 15 from the separator 14. The engine 15 is utilized to drive a dynamo 16 which furnishes current for the operation of various auxiliary apparatus including the pump 2 above referred to.

A by-pass or shunt connection 17 is interposed in the line 11, this connection having an automatic pressure relief valve 18 of suitable construction, the office of which is to prevent pressure from accumulating in the generator 3 when the engine 15 is idle or when the gas which is being generated is not being used with sufficient rapidity.

The aqua from which gas has been liberated is conducted away from the generator 3 to a secondary generator 19. The aqua, as it leaves the generator 3, is highly heated, having a temperature of approximately 250° and in effecting a further liberation of gas in the secondary generator 19, the intrinsic heat of the aqua is alone used and there is no further addition of heat from an extrinsic source.

In order that the heat of the aqua itself may be utilized in effecting the separation of any gas carried over from the primary generator it is necessary that the aqua should be broken up into a spray in the secondary generator. For this purpose it is preferred to use the secondary generator construction shown in Fig. 2 which, however, is to be regarded merely as by way of example. The pipe 20 which conducts the hot aqua from the generator 3 to the generator 19 is connected to the upper end of a tubular column 21 which is arranged centrally and axially of the casing of the generator 19. The column 21 forms, in effect, an angular extension of the pipe 20 and is provided at suitable intervals with groups of spraying nozzles 22. The nozzles 22 radiate in an upward direction from the column 21 and each group thereof is arranged under a conical deflector 23. The nozzles 22 discharge the hot aqua against the concave under sides of the deflectors 23 which cause the sprays of aqua to fall toward the lower end of the casing of the generator. The aqua accumulating in the lower end of the casing is conducted away by a pipe 24. By virtue of the heat of the aqua and of the fact that it falls for a substantial length, in the form of a spray, in the generator 19, any gas which may have been carried over from the generator 3 is liberated and is conducted away by a pipe 25 to the line of piping 11.

It may be observed that the gas which furnishes power for the operation of the engine 15 exhausts from said engine at the same pressure as the gas which is carried to the line 11 through the pipe 25. In order to provide for the regulation of the intensity of the streams which are discharged by the nozzles 22, the column 21 is provided at its lower end with an angular discharge pipe 50 which has a portion thereof disposed externally of the casing of the generator 19 and provided with a regulating valve 51. Obviously, when the flow of liquor through the pipe 50 is reduced by the manipulation of the valve 51, the intensity of the streams discharged by the nozzles 22 is increased, and, on the other hand, when the flow of aqua through the pipe 50 is increased by the manipulation of the valve 51, the intensity of the streams discharged by the nozzles 22 is reduced.

At this point it may be noted that the secondary generator herein disclosed, while especially useful when combined in the manner described with the generator 3, will also perform efficient service when used by itself as a primary generator either with the aid of internally arranged heating surfaces for supplying extrinsic heat or with the aid of the element 6 alone.

The weak liquor which is conducted away from the generator 19 by the pipe 24 passes successively through a vacuum evaporator 26, a boiler feed water heater 27 and a weak liquor cooler 28, passing from the latter to the absorber 1. The weak liquor of course gives up a relatively large percentage of its heat in the vacuum evaporator 26 and in the boiler feed water heater 27 and is, therefore, readily reduced to the temperature requisite for the re-absorption of ammonia by the agency of the cooler 28. The cooler 28 and the boiler feed water heater 27 may be of any suitable construction but it is convenient and preferred to employ the well known counter current heat interchanger, and such a construction is shown diagrammatically in the drawings. The boiler feed water is utilized as the cooling medium in the cooler 28 and is conducted to said cooler directly from the boiler feed pump, (not shown), by a pipe 29. The boiler feed water is conducted from the cooler 28 to the boiler feed water heater 27 by a pipe 30. The boiler feed water is of course preliminarily warmed in the cooler 28 and its temperature is, therefore, readily raised in the boiler feed water heater 27. The heater 27 is connected with the boiler 4 by a pipe 31 which is provided with a branch 32 leading to the vacuum evaporator 26. Thus, the water which discharges from the heater 27 is divided into two streams, one of which passes to the boiler and the other of which passes to the vacuum evaporator 26. The weak liquor is conducted from the vacuum evaporator 26 to the feed water heater 27 by a pipe 33 and after circulating through the coils of said heater it is conducted from the latter to the weak liquor cooler 28 by a pipe 34. The cold weak liquor is conducted from the cooler 28 to the absorber 1 by a pipe 35. The absorber is provided with a gas conducting pipe 36 through which gas is induced into the absorber to be taken up by the cold liquor.

The office of the vacuum evaporator 26 is to utilize the heat of the hot weak liquor issuing from the secondary generator 19 in making up the deficiency of distilled water required for ice. The vacuum evaporator 26 may be of any suitable construction for the purposes in view. It preferably includes a casing which is connected at one end to the water pipe 32 and at the other end to a pipe 38 which leads to a vacuum steam condenser 39 of suitable construction, and a coil 37 submerged in the water in the casing and through which the hot weak aqua circulates, said coil being connected at its ends to the respective pipes 24 and 33.

The vacuum steam condenser is connected with a suitable vacuum pump, (not shown), and the water which flows through the casing of the evaporator 26 is readily converted into steam by the heat of the liquor passing through the coil 37 in conjunction with the low pressure created by the vacuum pump. The steam conducted by the pipe 38 is condensed in the condenser 39 and is carried away by a pipe 40 to the ice-making apparatus.

By virtue of the features of arrangement and combination herein described, the amount of liquor required is reduced to a minimum, and there is, therefore, a reduction of the load on the auxiliary apparatus, the generation of gas is effected with maximum efficiency and with relatively small heat exchanging surfaces; the heat of the weak aqua is efficiently utilized for various useful purposes in connection with the operation of the system throughout the travel of said aqua from the generators to the absorber; the radiation losses are reduced to a minimum; and the actual waste or dead loss of heat units is negligible.

Having fully described my invention, I claim:—

1. In a refrigerating system, in combination, a gas generator, a steam line leading thereto, a gas line leading therefrom, a condenser at the end of the gas line, a gas operated engine interposed in the gas line, a shunt connection also interposed in the gas line and a relief valve in the shunt connection.

2. In a refrigerating system, in combination, primary and secondary generators, a rich aqua line leading to the primary generator, a high pressure steam line leading to the primary generator, an aqua line leading from the primary to the secondary generator, means for breaking the hot aqua in the secondary generator into a spray whereby the intrinsic heat of the aqua is utilized in the secondary generator in liberating the gas and gas conducting pipes leading from said generators.

3. In a refrigerating system, a spray generator, an aqua pipe communicating therewith, a vertical column arranged within said generator as a continuation of said pipe and having spraying nozzles, an aqua conducting pipe leading from the lower end of the generator and a bent pipe provided at the lower end of the column and discharging aqua into the generator, the said pipe having a portion thereof external to said generator provided with a regulating valve.

4. In a refrigerating system, in combination, a rich aqua line, a gas generator, means for heating the rich aqua before it reaches said generator, a gas pipe leading from the generator, means for causing the aqua to pass through the generator as a falling spray whereby the intrinsic heat of the aqua may be utilized to liberate the gas, and means for conducting the weak liquor away from the generator.

5. In a refrigerating system, a spray generator, a rich aqua pipe communicating therewith, spray nozzles arranged within said generator and which are supplied by said pipe, and means for controlling the force of the aqua issuing from said spray nozzles.

6. In a refrigerating system, in combination, a rich aqua line, a gas generator, means for heating the rich aqua before it reaches the said generator, a gas pipe leading from the generator, the generator including means for utilizing the intrinsic heat of the aqua to effect the liberation of gas, and means for conducting the weak liquor away from the generator.

7. In a refrigerating system, in combination, primary and secondary generators, a rich aqua line leading to the primary generator, a steam line leading to the primary generator, an aqua line leading from the primary to the secondary generator, the latter including means for utilizing the intrinsic heat of the aqua to effect the liberation of gas, and gas conducting pipes leading from said generators.

In testimony whereof I have hereunto set my hand in presence of two subscribing witnesses.

JOHN B. HOWE.

Witnesses:
J. W. BRUZELL,
G. W. MCDANIEL.